United States Patent
Zhang et al.

(10) Patent No.: US 9,858,639 B2
(45) Date of Patent: *Jan. 2, 2018

(54) IMAGING SURFACE MODELING FOR CAMERA MODELING AND VIRTUAL VIEW SYNTHESIS

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Bakhtiar B. Litkouhi, Washington, MI (US); Kent S. Lybecker, Rochester, MI (US); Ryan M. Frakes, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/944,409

(22) Filed: Nov. 18, 2015

(65) Prior Publication Data

US 2016/0098815 A1 Apr. 7, 2016

Related U.S. Application Data

(63) Continuation of application No. 13/836,557, filed on Mar. 15, 2013, now Pat. No. 9,225,942.

(51) Int. Cl.
*H04N 7/18* (2006.01)
*H04N 7/00* (2011.01)
(Continued)

(52) U.S. Cl.
CPC ............ *G06T 3/0062* (2013.01); *B60R 1/00* (2013.01); *G06T 3/0018* (2013.01); *G06T 7/75* (2017.01);
(Continued)

(58) Field of Classification Search
CPC ........................................................ B60R 1/00
(Continued)

(56) References Cited

U.S. PATENT DOCUMENTS

| 7,554,573 B2 * | 6/2009 | Mizusawa ............... B60R 1/00 348/113 |
| 2002/0003571 A1 * | 1/2002 | Schofield ............... B60C 23/00 348/148 |

(Continued)

OTHER PUBLICATIONS

Courbon, et al., A Generic Fisheye camera model for robotic applications, Oct. 29-Nov. 2, 2007, Proceedings of the 2007 IEEE/RSJ International Conference on Intelligent Robots and Systems San Diego, CA, USA, entire document.*

(Continued)

*Primary Examiner* — Dave Czekaj
*Assistant Examiner* — Alison Slater
(74) *Attorney, Agent, or Firm* — Quinn IP Law (57) ABSTRACT

A method of displaying a captured image on a display device. A real image is captured by an image capture device. The image capture device uses a field-of-view lens that distorts the real image. A camera model is applied to the captured real image. The camera model maps objects in the captured real image to an image sensor plane of the image capture device to generate a virtual image. The image sensor plane is reconfigurable to virtually alter a shape of the image sensor plane to a non-planar surface. The virtual image formed on the non-planar image surface of the image sensor is projected to the display device.

34 Claims, 10 Drawing Sheets

(51) Int. Cl.
*H04N 13/02* (2006.01)
*B60R 11/04* (2006.01)
*G06F 17/17* (2006.01)
*G06K 9/36* (2006.01)
*G06K 9/54* (2006.01)
*G06T 3/00* (2006.01)
*B60R 1/00* (2006.01)
*H04N 5/232* (2006.01)
*G06T 7/73* (2017.01)

(52) U.S. Cl.
CPC .......... *H04N 5/23238* (2013.01); *H04N 7/18* (2013.01); *B60R 2300/10* (2013.01); *B60R 2300/306* (2013.01); *B60R 2300/802* (2013.01); *B60R 2300/8093* (2013.01); *G06T 2207/30244* (2013.01); *G06T 2207/30264* (2013.01)

(58) Field of Classification Search
USPC .......................................... 348/148; 382/154
See application file for complete search history.

(56) References Cited

U.S. PATENT DOCUMENTS

| | | | | |
|---|---|---|---|---|
| 2003/0169522 A1* | 9/2003 | Schofield | .................. | B60R 1/04 359/876 |
| 2004/0032649 A1* | 2/2004 | Kondo | .................. | G03B 35/00 359/364 |
| 2005/0117708 A1* | 6/2005 | Cho | .................. | A61B 6/547 378/164 |
| 2006/0125919 A1* | 6/2006 | Camilleri | .................. | B60R 1/00 348/148 |
| 2010/0208032 A1* | 8/2010 | Kweon | .................. | G03B 37/00 348/36 |
| 2011/0074916 A1* | 3/2011 | Demirdjian | ............... | B60R 1/00 348/36 |
| 2012/0242788 A1* | 9/2012 | Chuang | ............ | G08B 13/19602 348/36 |
| 2012/0300020 A1* | 11/2012 | Arth | .......................... | G06T 7/75 348/36 |
| 2013/0070095 A1* | 3/2013 | Yankun | .............. | G06K 9/00805 348/148 |
| 2014/0125774 A1* | 5/2014 | Lee | ....................... | G06T 3/4038 348/47 |

OTHER PUBLICATIONS

Kweon et al., Image-processing Based Panoramic Camera Employing Single Fisheye Lens, Journal of the Optical Society of Korea vol. 14, No. 3, Sep. 2010, pp. 245-259.*

Ma et al., Rational Radial Distortion Models of Camera Lenses with Analytical Solution for Distortion Correction, Apr. 10, 2004 20:4 "rational IJIA".*

El Melegey et al., Statistically Robust Approach to Lens Distortion Calibration with Model Selection, 1063-6919/03 $17.00 © 2003 IEEE.*

Szeliski, Video Mosaics for Virtual Environments, IEEE Computer Graphics and Applications (c) 1996 IEEE vol. 16, No. 2: Mar. 1996, pp. 22-30.*

Wu et al., An Improved Polynomials Model Using RBF Network for Fish-eye Lens Correction, Journal of Information & Computational Science 9: 13 (2012) 3655-3663 Available at http://www.joics.com.*

T. Gandhi, M. M. Trivedi. Vehicle Surround Capture: Survey of Techniques and a Novel Omni-Video-Based Approach for Dynamic Panoramic Surround Maps. IEEE Trans. on Intelligent Transportation Systems, vol. 7 (3), pp. 293-308, 2006.

S. Thibault. Novel Compact Panomorph Lens Based Vision System for Monitoring Around a Vehicle. Proceedings of the SPIE, vol. 7003, pp. 70032I-70032I-9, 2008.

B. Zitova, J. Flusser. Image Registration Methods: A Survey. Image and Vision Computing, 21, pp. 977-1000, 2003.

M. Brown, D. G. Lowe. Automatic Panoramic Image Stitching using Invariant Features. International Journal of Computer Vision, 74(1), pp. 59-73, 2007.

* cited by examiner

Camera = Planar Image Plane + Radial Distortion Correction + Pin-hole Camera Model

PRIOR ART
Fig. 3

Planar De-warping

Captured Image    De-warped Image

Fig. 4

Camera = Non-Planar Image Plane + Pin-hole Camera Model

Fig. 5

Captured Image    De-warped Image

IMAGING SURFACE MODELING FOR CAMERA MODELING AND VIRTUAL VIEW SYNTHESIS

CROSS-REFERENCE TO RELATED APPLICATIONS

This application claims is a continuation of U.S. application Ser. No. 13/836,557 filed Mar. 15, 2013, which has priority of U.S. Provisional Application Ser. No. 61/712,433 filed Oct. 11, 2012, the disclosures of which is incorporated by reference.

BACKGROUND OF INVENTION

An embodiment relates generally to image capture and processing for in-vehicle vision systems.

Vehicle systems often use in-vehicle vision systems for rear-view scene detections, side-view scene detection, and forward view scene detection. For those applications that require graphic overlay or to emphasize an area of the captured image, it is critical to accurately calibrate the position and orientation of the camera with respect to the vehicle and the surrounding objects. Camera modeling which takes a captured input image from a device and remodels the image to show or enhance a respective region of the captured image must reorient all objects within the image without distorting the image so much that it becomes unusable or inaccurate to the person viewing the reproduced image.

Current rear back-up cameras on vehicles are typically wide FOV cameras, for example, a 135° FOV. Wide FOV cameras typically provide curved images that cause image distortion around the edges of the image. Various approaches are known in the art to provide distortion correction for the images of these types of cameras, including using a model based on a pinhole camera and models that correct for radial distortion by defining radial parameters.

In order to provide accurate depiction of the surroundings such as surround view or ultra wide views, an ultra-wide field-of-view camera may be used. Such cameras are typically referred to as fish-eye cameras because their image is significantly curved. For the image to be effective for various driving scenarios such as back-up applications, distortions in the images must be corrected and those portions that are required to be enhanced that are the focus of the image (available parking spot) must be displayed so that distortions do not degrade the image. Traditional virtual camera modeling uses a planar imaging surface representing the flat image sensor within a camera; however, such systems can only do limited distortion correction feature when projected on to a display device. Such displays are left uncorrected or complex routines must be applied to remove the distortions.

SUMMARY OF INVENTION

An advantage of the invention described herein is that a virtual image can be synthesized using various image effects utilizing a camera view synthesis one or multiple cameras. The image effects include generating an image that is viewed from a different camera pose than the real camera capturing the real image. For example, a backup camera that has its optical axis pointed 30 degrees down from a horizontal position can be modeled and synthesized for displaying a top down view as if the real camera is positioned above the vehicle looking directly perpendicular to the ground. The technique as described herein uses a non-planar imaging surface for modeling the captured image in a virtual camera model, whereas traditional virtual camera modeling approaches utilize a flat planar surface captured.

Moreover, the various arbitrary shapes may be utilized for enhancing a region of the captured image. For example, by utilizing an elliptical imaging surface, a center portion of the image may be enhanced (zoomed) without cutting off or distorting the end portions of the image. Various non-planar imaging surfaces may be dynamically inserted within the virtual camera model for synthesizing a view based on operating conditions of the vehicle. An example would a signal from a turn signal indicator that is provided to the processor where a nonplanar surface is used that enhances the region or direction that the vehicle is turning.

A method of displaying a captured image on a display device. A real image is captured by an image capture device. The image capture device uses a field-of-view lens that distorts the real image. A camera model is applied to the captured real image. The camera model maps objects in the captured real image to an image sensor plane of the image capture device to generate a virtual image. The image sensor plane is reconfigurable to virtually alter a shape of the image sensor plane to a non-planar surface. The virtual image formed on the non-planar image surface of the image sensor is projected to the display device.

DETAILED DESCRIPTION

Figure 1:
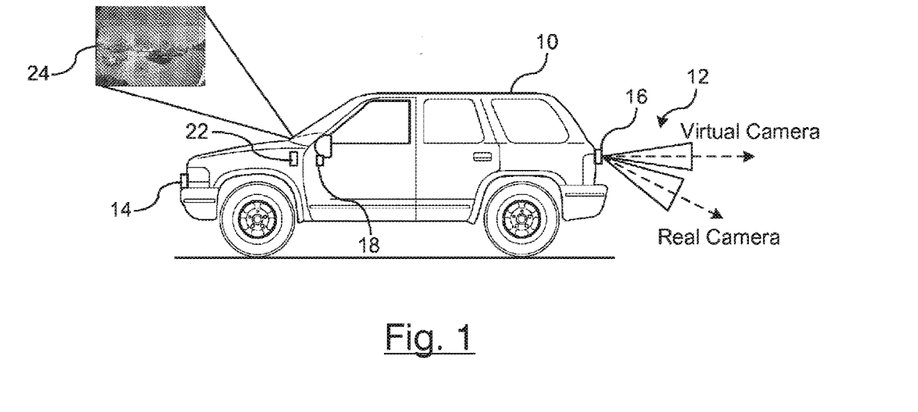
FIG. 1 is an illustration of a vehicle including a surround view vision-based imaging system.

There is shown in FIG. 1, a vehicle 10 traveling along a road. A vision-based imaging system 12 captures images of the road. The vision-based imaging system 12 captures images surrounding the vehicle based on the location of one or more vision-based capture devices. In the embodiments described herein, the vision-based imaging system will be described as capturing images rearward of the vehicle; however, it should also be understood that the vision-based imaging system 12 can be extended to capturing images forward of the vehicle and to the sides of the vehicle.

The vision-based imaging system 12 includes a front-view camera 14, a rear-view camera 16, a left-side view camera 18, and a right-side view camera (not shown). The cameras 14-18 can be any camera suitable for the purposes described herein, many of which are known in the automotive art, that are capable of receiving light, or other radiation, and converting the light energy to electrical signals in a pixel format using, for example, charged coupled devices (CCD). The cameras 14-18 generate frames of image data at a certain data frame rate that can be stored for subsequent processing. The cameras 14-18 can be mounted within or on any suitable structure that is part of the vehicle 10, such as bumpers, facie, grill, side-view mirrors, door panels, etc., as would be well understood and appreciated by those skilled in the art. In one non-limiting embodiment, the side camera 18 is mounted under the side view mirrors and is pointed downwards. Image data from the cameras 14-18 is sent to a processor 22 that processes the image data to generate images that can be displayed on a vehicle display 24.

In other embodiments, the vision-based imaging system 12 may be used to identify the clear path or lane markings in the road for systems such as, but not limited to, back-up object detection, lane departure warning systems, or lane centering. Although the vision-based imaging system 12 may be used for a variety of functions such as utilizing the captured image to recognize landmarks including, but not limited to, road markings, lane markings, road signs, buildings, trees, humans, or other roadway objects so that movement of landmarks between image frames of the video can be detected, the embodiments describe herein are mainly targeted at video imaging for displaying to the driver the environment surrounding the vehicle (e.g., such as backing up).

The present invention proposes an efficient and effective image modeling and de-warping process for ultra-wide FOV cameras that employs a simple two-step approach and offers fast processing times and enhanced image quality without utilizing radial distortion correction. Distortion is a deviation from rectilinear projection, a projection in which straight lines in a scene remain straight in an image. Radial distortion is a failure of a lens to be rectilinear.

The two-step approach as discussed above includes (1) applying a camera model to the captured image for projecting the captured image on a non-planar surface and (2) applying a view synthesis for mapping the virtual image projected on to the non-planar surface to the real display image. For view synthesis, given one or more images of a specific subject taken from specific points with specific camera setting and orientations, the goal is to build a synthetic image as taken from a virtual camera having a same or different optical axis. The term "virtual camera" is a simulated camera with simulated camera model parameters and simulated imaging surface, in addition to a simulated camera pose. The camera modeling is performed by processor or multiple processors. The term "virtual image" is a synthesized image of a scene using the virtual camera modeling.

The proposed approach provides effective surround view and dynamic rearview mirror functions with an enhanced de-warping operation, in addition to a dynamic view synthesis for ultra-wide FOV cameras. Camera calibration as used herein refers to estimating a number of camera parameters including both intrinsic and extrinsic parameters. The intrinsic parameters include focal length, optical center, radial distortion parameters, etc. and extrinsic parameters include camera location, camera orientation, etc.

Figure 2:
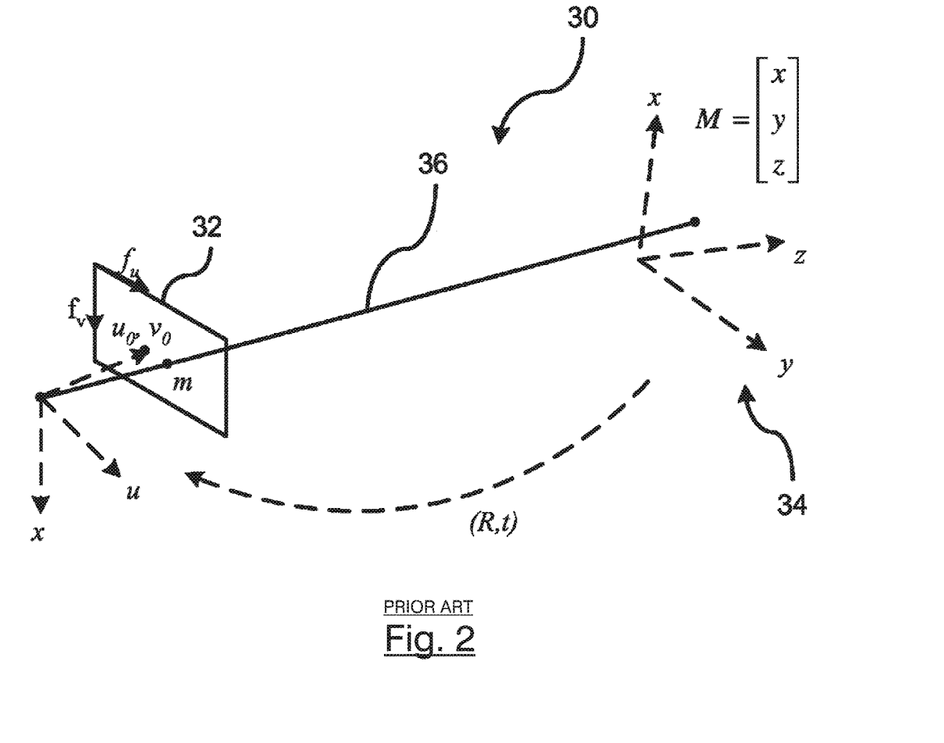
FIG. 2 is an illustration for a pinhole camera model.

Camera models are known in the art for mapping objects in the world space to an image sensor plane of a camera to generate an image. One model known in the art is referred to as a pinhole camera model that is effective for modeling the image for narrow FOV cameras. The pinhole camera model is defined as:

$$S \underbrace{\begin{bmatrix} u \\ v \\ 1 \end{bmatrix}}_{m} = \underbrace{\begin{bmatrix} f_u & \gamma & u_c \\ 0 & f_v & v_c \\ 0 & 0 & 1 \end{bmatrix}}_{A} \underbrace{\begin{bmatrix} r_1 & r_2 & r_3 & t \end{bmatrix}}_{[R\ t]} \underbrace{\begin{bmatrix} x \\ y \\ z \\ 1 \end{bmatrix}}_{M} \quad (1)$$

FIG. 2 is an illustration 30 for the pinhole camera model and shows a two dimensional camera image plane 32 defined by coordinates u, v, and a three dimensional object space 34 defined by world coordinates x, y, and z. The coordinates system for a camera model is defined as the z-axis being aligned with a camera optical axis pointing outward from the camera, and an x-axis and y-axis form a plane which is perpendicular to the optical axis (z-axis) and intersects with the optical axis at the camera aperture location. The distance from a focal point C to the image plane 32 is the focal length f of the camera and is defined by focal length $f_u$ and $f_v$. A perpendicular line from the point C to the principle point of the image plane 32 defines the image center of the plane 32 designated by $u_0$, $v_0$. In the illustration 30, an object point M in the object space 34 is mapped to the image plane 32 at point m, where the coordinates of the image point m is $u_c$, $v_c$.

Equation (1) includes the parameters that are employed to provide the mapping of point M in the object space 34 to point m in the image plane 32. Particularly, intrinsic parameters include $f_u$, $f_v$, $u_c$, $v_c$ and γ and extrinsic parameters include a 3 by 3 matrix R for the camera rotation and a 3 by 1 translation vector t from the image plane 32 to the object space 34. The parameter γ represents a skewness of the two image axes that is typically negligible, and is often set to zero.

Since the pinhole camera model follows rectilinear projection which a finite size planar image surface can only cover a limited FOV range (<<180° FOV), to generate a cylindrical panorama view for an ultra-wide (~180° FOV) fisheye camera using a planar image surface, a specific camera model must be utilized to take horizontal radial distortion into account. Some other views may require other specific camera modeling, (and some specific views may not be able to be generated). However, by changing the image plane to a non-planar image surface, a specific view can be easily generated by still using the simple ray tracing and pinhole camera model. As a result, the following description will describe the advantages of utilizing a non-planar image surface.

The in-vehicle display device 24 (shown in FIG. 1) outputs images captured by the vision-based imaging system 12. The images may be altered images that may be converted to show enhanced viewing of a respective portion of the FOV of the captured image. For example, an image may be altered for generating a panoramic scene, or an image may be generated that enhances a region of the image in the direction of which a vehicle is turning. The proposed approach as described herein models a wide FOV camera with a concave imaging surface for a simpler camera model without radial distortion correction. This approach utilizes virtual view synthesis techniques with a novel camera imaging surface modeling (e.g., light-ray-based modeling). This technique has a variety of applications of rearview camera applications that include dynamic guidelines, 360 surround view camera system, and dynamic rearview mirror feature. This technique simulates various image effects through the simple camera pin-hole model with various camera imaging surfaces. It should be understood that other models, including traditional models, can be used aside from a camera pin-hole model.

Figure 3:
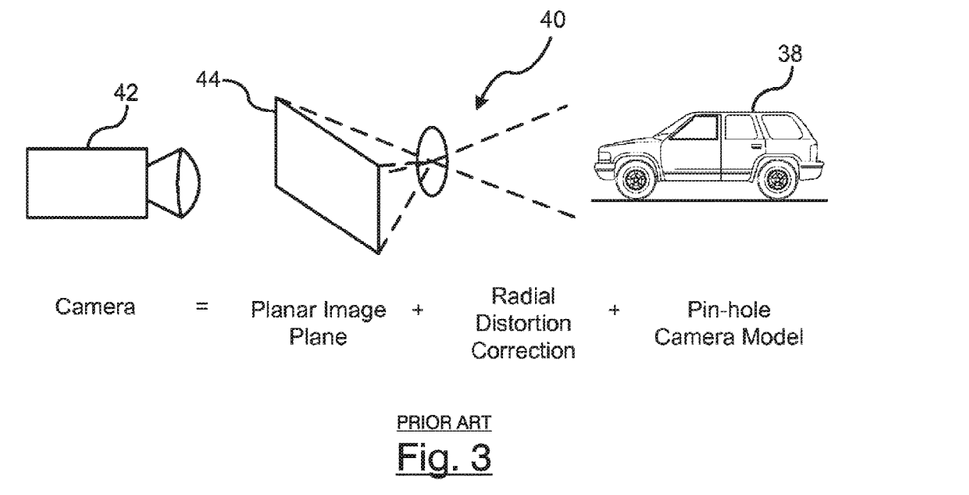
FIG. 3 is an illustration of a planar radial distortion virtual model.

FIG. 3 illustrates a prior art approach. The prior art approach that utilizes camera modeling and view synthesis assumes a planar imaging plane in the modeling with radial distortion correction. In FIG. 3, a scene 38 is captured by a vision-based imaging system. A virtual camera model 40 is used to create a virtual image as seen by a virtual camera 42. The capture scene 38 is modeled onto a planar image surface 44 with radial distortion. A radial distortion correction technique is applied to the image modeled on the planar surface to correct distortions in an attempt to make the image look as though it was captured through a pin-hole camera.

Figure 4:
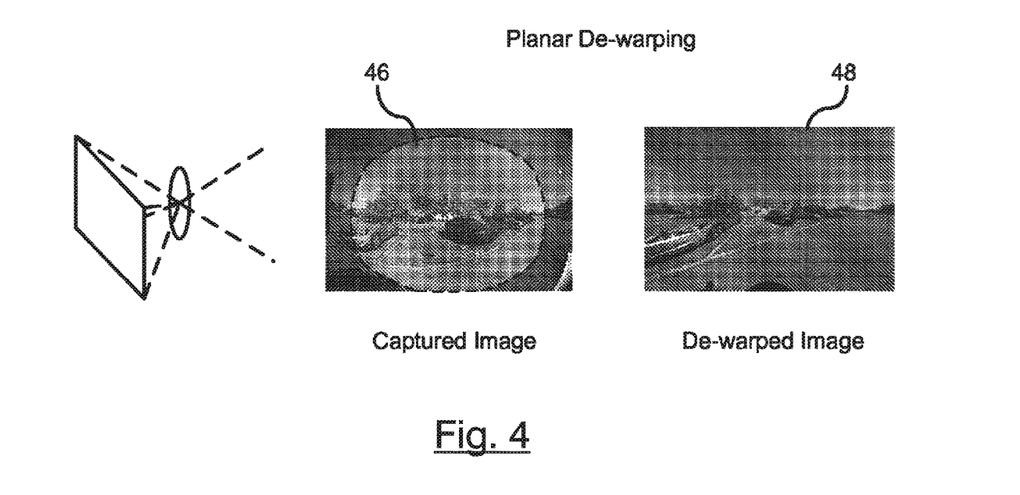
FIG. 4 is an illustration of input/output imaging for the planar radial distortion model.

FIG. 4 illustrates a view synthesis applied to the image projected onto the planar surface. As shown in FIG. 4, the highlighted region 46 is the area of focus for which a planar image view synthesis is applied to the captured image using the pin-hole camera model. After view synthesis is applied to perform planar de-warping, a distorted picture of the image is produced. As shown in the de-warped image 48, end portions of the image are still warped. Although the available parking space is centered in the image, the distorted ends are not conducive to the driver in viewing the image when the driver attempts to park the vehicle in the available parking space as the distortions to the sides can be distracting to the driver.

Figure 5:
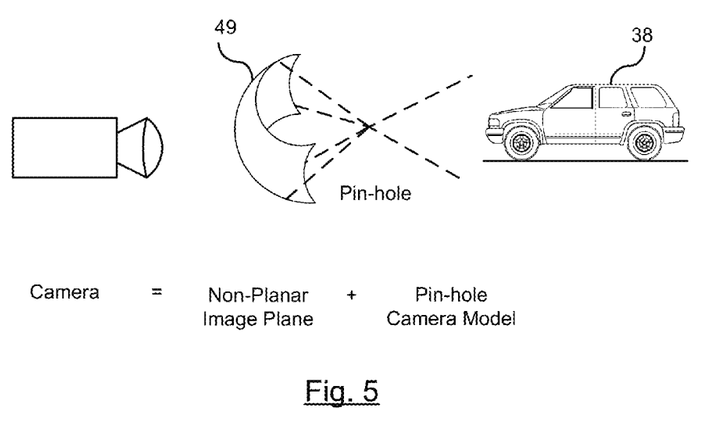
FIG. 5 is an illustration of a non-planar pin-hole camera model

FIG. 5 illustrates a preferred technique for modeling the captured scene 38 using a non-planar image surface. Using the pin-hole model, the captured scene 38 is projected onto a non-planar image 49 (e.g., concave surface). No radial distortion correction is applied to the projected image since the images is being displayed on a non-planar surface.

Figure 6:
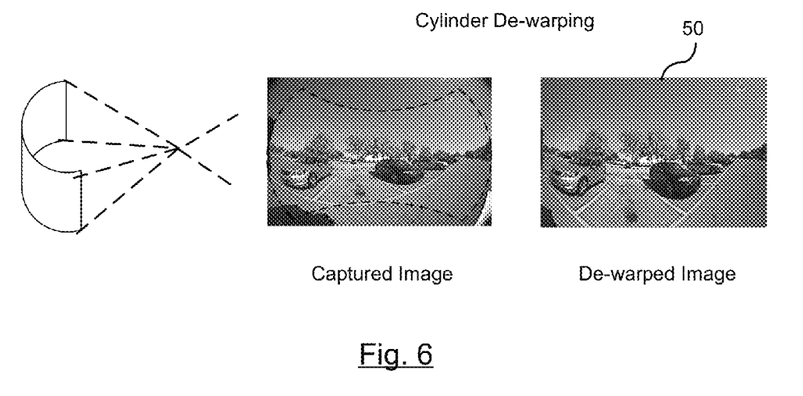
FIG. 6 is an illustration of input/output imaging for the non-planar model.

A view synthesis technique is applied to the projected image on the non-planar surface for de-warping the image. In FIG. 5, image de-warping is achieved using a concave image surface. Such surfaces may include, but is not limited to, a cylinder and ellipse image surfaces. That is, the captured scene is projected onto a cylindrical like surface using a pin-hole model. Thereafter, the image projected on the cylinder image surface is laid out on the flat in-vehicle image display device. As shown in the de-warped image 50 of FIG. 6, the parking space which the vehicle is attempting to park is enhanced for better viewing for assisting the driver in focusing on the area of intended travel.

Figure 7:
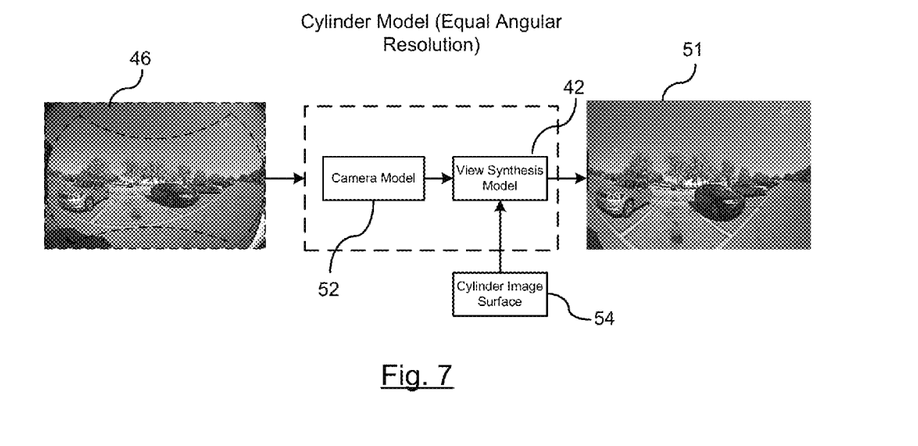
FIG. 7 is a block flow diagram utilizing cylinder image surface modeling.

FIG. 7 illustrates a block flow diagram for applying cylinder image surface modeling to the captured scene. A captured scene is shown at block 46. Camera modeling 52 is applied to the captured scene 46. As described earlier, the camera model is preferably a pin-hole camera model; however, traditional or other camera modeling may be used. The captured image is projected on a respective surface using the pin-hole camera model. The respective image surface is a cylindrical image surface 54. View synthesis 42 is performed by mapping the light rays of the projected image on the cylindrical surface to the flat surface to generate a de-warped image. The result is an enhanced view of the available parking space where the parking space is centered at the forefront of the de-warped image 51.

Figure 8:
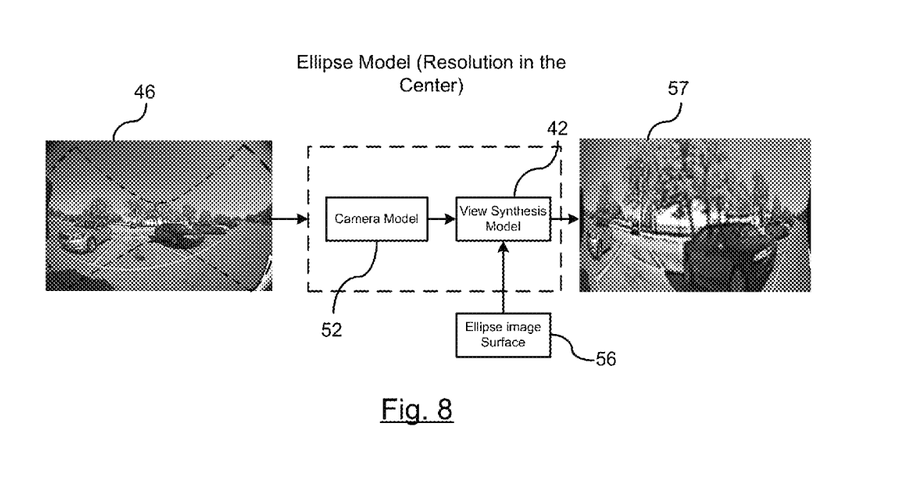
FIG. 8 is a block flow diagram utilizing an ellipse image surface model.

FIG. 8 illustrates a flow diagram for utilizing an ellipse image surface model to the captured scene utilizing the pin-hole model. The ellipse image model 56 applies greater resolution to the center of the capture scene 46. Therefore, as shown in the de-warped image 57, the objects at the center forefront of the de-warped image are more enhanced using the ellipse model in comparison to FIG. 7.

Figure 9:
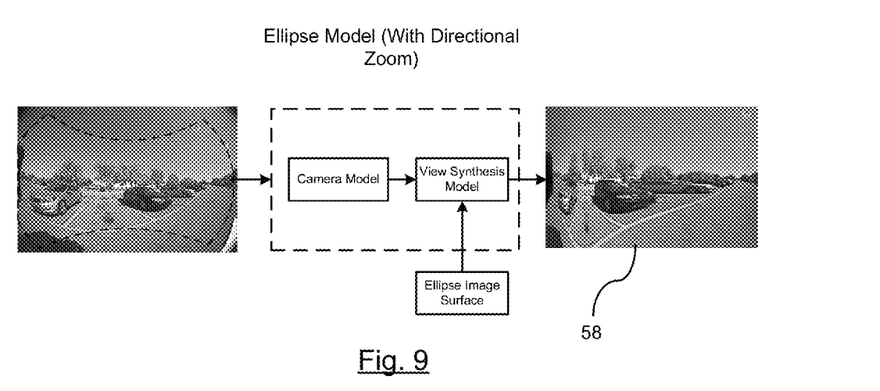
FIG. 9 is a flow diagram utilizing an ellipse image surface with directional zoom.
Figure 10:
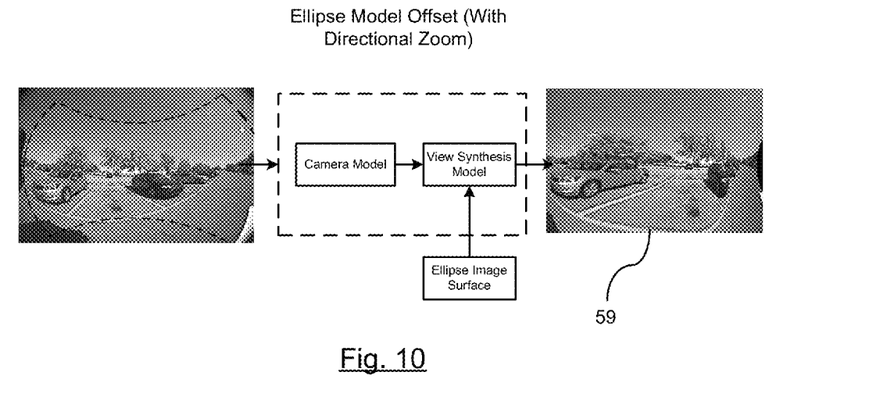
FIG. 10 is a flow diagram utilizing an ellipse image surface with directional zoom.

FIGS. 9 and 10 illustrate flow diagrams for applying an ellipse image surface with directional zoom to the captured scene using the pin-hole model. In FIG. 9, a directional zoom pans to a left side of the captured image. As shown in the de-warped image 58 of FIG. 9, the greater resolution is applied to the left side of the image as objects on the left side of the image are enhanced and at the forefront of the de-warped image.

In FIG. 10, a directional zoom pans to a right side of the captured image. As shown in the de-warped image 59 of FIG. 10, the greater resolution is applied to the right side of the image as objects on the right side are enhanced and at the forefront of the de-warped image.

Dynamic view synthesis is a technique by which a specific view synthesis is enabled based on a driving scenario of a vehicle operation. For example, special synthetic modeling techniques may be triggered if the vehicle is in driving in a parking lot versus a highway, or may be triggered by a proximity sensor sensing an object to a respective region of the vehicle, or triggered by a vehicle signal (e.g., turn signal, steering wheel angle, or vehicle speed). The special synthesis modeling technique may be to apply respective shaped image surfaces and virtual camera modeling to a captured image, or apply virtual pan, tilt, or directional zoom depending on a triggered operation. As a result, virtual imaging surfaces may be switched base on different driving needs or driving conditions. For example, while driving along a road, an elliptical image surface may be utilized to magnify a center-view to mimic a field-of-view and object size as seen from the rearview mirror. In another scenario, while passing a vehicle, or pulling out into cross traffic, a cylindrical imaging surface or a stitched planar imaging surface may be used to see obstacles to the sides of the driven vehicle. In yet another scenario, while performing a back-up maneuver into a parking space, a top-down view or stitched side views could be applied to guide the vehicle into a parking space and providing a view as to the proximity of adjacent vehicles, pedestrians, or curbs. Any arbitrary shape may be used as the imaging surface so long as the shape satisfies a homographic mapping constraint (1 to 1).

Figure 11:
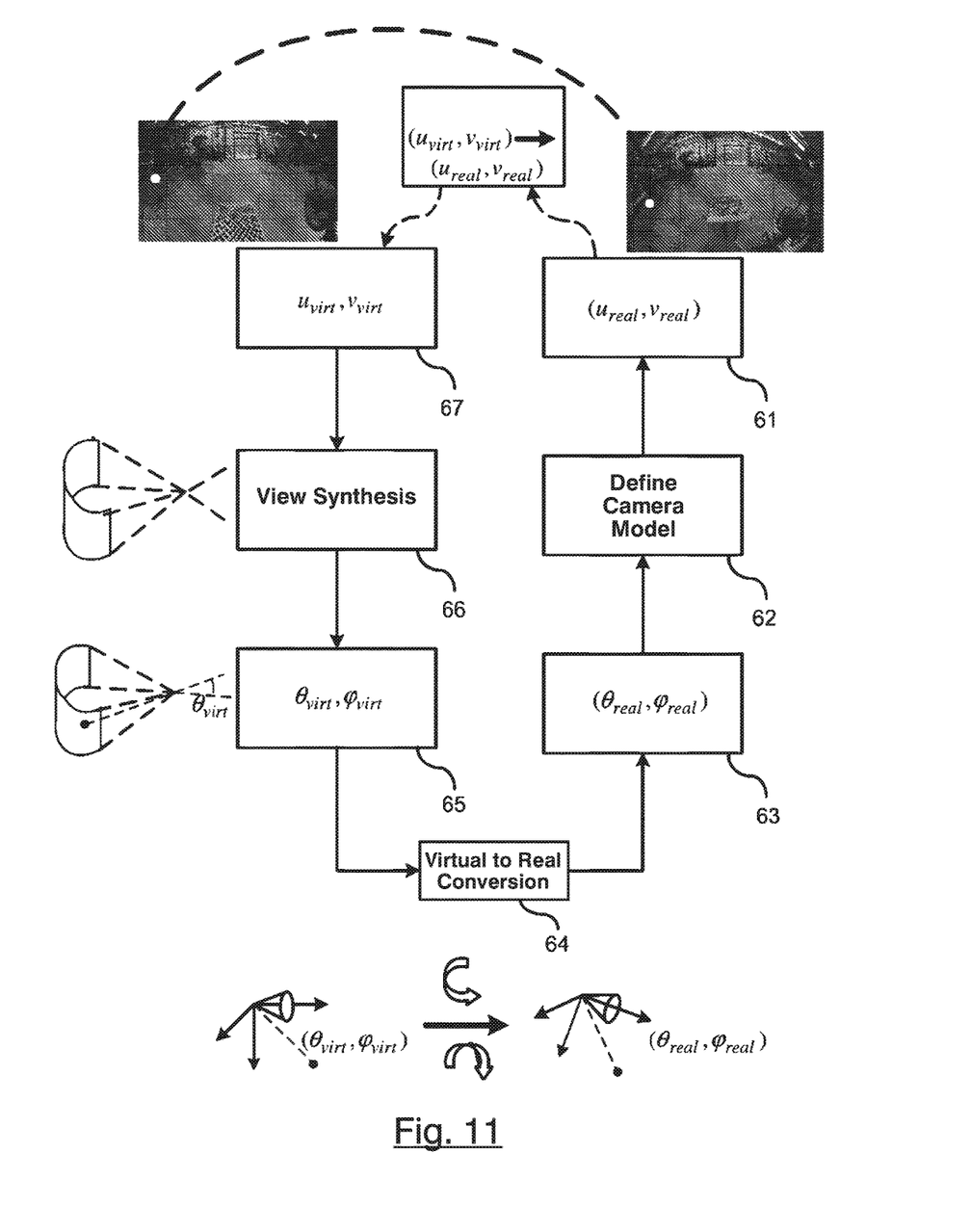
FIG. 11 is a flow diagram of view synthesis for mapping a point between a real image and the virtual image.

FIG. 11 illustrates a flow diagram of view synthesis for mapping a point between a real image and the virtual image. In block 61, a real point on the captured image is identified by coordinates $u_{real}$ and $v_{real}$ which identify where an incident ray contacts an image surface. An incident ray can be represented by the angles $(\theta, \varphi)$, where $\theta$ is the angle between the incident ray and an optical axis, and φ is the angle between the x axis and the projection of the incident ray on the x-y plane. To determine the incident ray angle, a real camera model is pre-determined and calibrated. The real camera is a model of the vision-based imaging device and a real image is an image of a scene which is captured by the vision-based imaging device.

Figure 12:
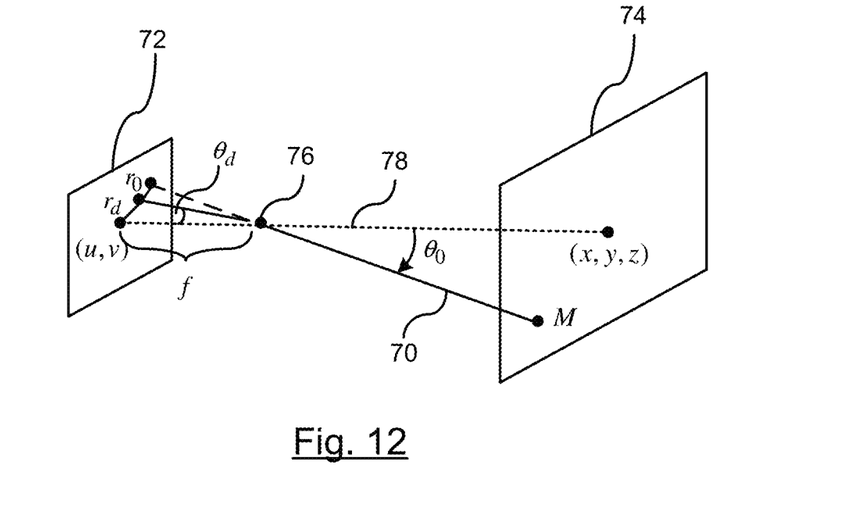
FIG. 12 is an illustration of a radial distortion correction model.

In block 62, the real camera model is defined, such as the fisheye model ($r_d$=func($\theta$) and φ) and an imaging surface is defined. That is, the incident ray as seen by a real fish-eye camera view may be illustrated as follows:

$$\text{Incident ray} \rightarrow \begin{bmatrix} \theta: \text{angle between incident ray} \\ \text{and optical axis} \\ \varphi: \text{angle between } x_{c1} \text{ and} \\ \text{incident ray projection on} \\ \text{the } x_{c1} - y_{c1} \text{ plane} \end{bmatrix} \rightarrow \qquad (2)$$

$$\begin{bmatrix} r_d = func(\theta) \\ \varphi \end{bmatrix} \rightarrow \begin{bmatrix} u_{c1} = r_d \cdot \cos(\varphi) \\ v_{c1} = r_d \cdot \sin(\varphi) \end{bmatrix}$$

where $u_{c1}$ represents $u_{real}$ and $v_{c1}$ represents $v_{real}$. A radial distortion correction model is shown in FIG. 12. The radial distortion model, represented by equation (3) below, sometimes referred to as the Brown-Conrady model, provides a correction for non-severe radial distortion for objects imaged on an image plane 72 from an object space 74. The focal length f of the camera is the distance between point 76 and the image center where the lens optical axis intersects with the image plane 72. In the illustration, an image location $r_0$ at the intersection of line 70 and the image plane 72 represents a virtual image point $m_0$ of the object point M if a pinhole camera model is used. However, since the camera image has radial distortion, the real image point m is at location $r_d$, which is the intersection of the line 78 and the image plane 72. The values $r_0$ and $r_d$ are not points, but are the radial distance from the image center $u_0$, $v_0$ to the image points $m_0$ and m.

$$r_d = r_0(1 + k_1 \cdot r_0^2 + k_2 \cdot r_0^4 + k_2 \cdot r_0^6 + \ldots) \qquad (3)$$

The point $r_0$ is determined using the pinhole model discussed above and includes the intrinsic and extrinsic parameters mentioned. The model of equation (3) is an even order polynomial that converts the point $r_0$ to the point $r_d$ in the image plane 72, where k is the parameters that need to be determined to provide the correction, and where the number of the parameters k define the degree of correction accuracy. The calibration process is performed in the laboratory environment for the particular camera that determines the parameters k. Thus, in addition to the intrinsic and extrinsic parameters for the pinhole camera model, the model for equation (3) includes the additional parameters k to determine the radial distortion. The non-severe radial distortion correction provided by the model of equation (3) is typically effective for wide FOV cameras, such as 135° FOV cameras. However, for ultra-wide FOV cameras, i.e., 180° FOV, the radial distortion is too severe for the model of equation (3) to be effective. In other words, when the FOV of the camera exceeds some value, for example, 140°-150°, the value $r_0$ goes to infinity when the angle θ approaches 90°. For ultra-wide FOV cameras, a severe radial distortion correction model shown in equation (4) has been proposed in the art to provide correction for severe radial distortion.

Figure 13:
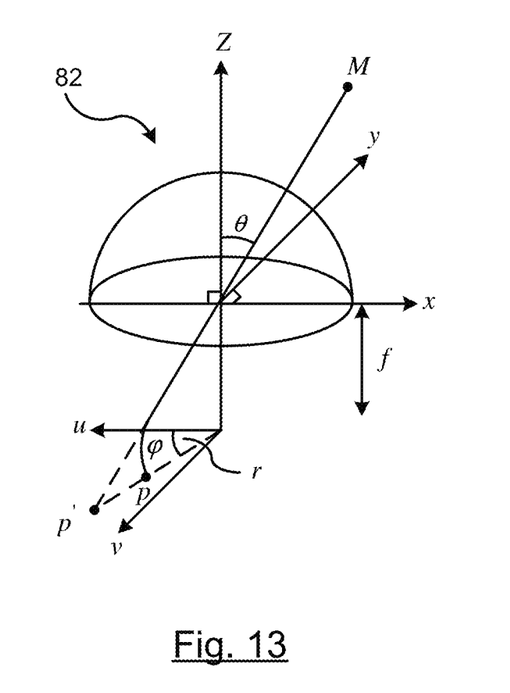
FIG. 13 is an illustration of a severe radial distortion model.

FIG. 13 illustrates a fisheye model which shows a dome to illustrate the FOV. This dome is representative of a fisheye lens camera model and the FOV that can be obtained by a fisheye model which is as large as 180 degrees or more. A fisheye lens is an ultra wide-angle lens that produces strong visual distortion intended to create a wide panoramic or hemispherical image. Fisheye lenses achieve extremely wide angles of view by forgoing producing images with straight lines of perspective (rectilinear images), opting instead for a special mapping (for example: equisolid angle), which gives images a characteristic convex non-rectilinear appearance This model is representative of severe radial distortion due which is shown in equation (4) below, where equation (4) is an odd order polynomial, and includes a technique for providing a radial correction of the point $r_0$ to the point $r_d$ in the image plane 79. As above, the image plane is designated by the coordinates u and v, and the object space is designated by the world coordinates x, y, z. Further, θ is the incident angle between the incident ray and the optical axis. In the illustration, point p' is the virtual image point of the object point M using the pinhole camera model, where its radial distance $r_0$ may go to infinity when θ approaches 90°. Point p at radial distance r is the real image of point M, which has the radial distortion that can be modeled by equation (4).

The values p in equation (4) are the parameters that are determined. Thus, the incidence angle θ is used to provide the distortion correction based on the calculated parameters during the calibration process.

$$r_d = p_1 \cdot \theta_0 + p_2 \cdot \theta_0^3 + p_3 \cdot \theta_0^5 + \ldots \qquad (4)$$

Various techniques are known in the art to provide the estimation of the parameters k for the model of equation (3) or the parameters p for the model of equation (4). For example, in one embodiment a checker board pattern is used and multiple images of the pattern are taken at various viewing angles, where each corner point in the pattern between adjacent squares is identified. Each of the points in the checker board pattern is labeled and the location of each point is identified in both the image plane and the object space in world coordinates. The calibration of the camera is obtained through parameter estimation by minimizing the error distance between the real image points and the reprojection of 3D object space points.

In block 63, a real incident ray angle ($\theta_{real}$) and ($\varphi_{real}$) are determined from the real camera model. The corresponding incident ray will be represented by a ($\theta_{real}, \varphi_{real}$).

Block 64 represents a conversion process (described in FIG. 16) where a pan and/or tilt condition is present.

In block 65, a virtual incident ray angle $\theta_{virt}$ and corresponding $\varphi_{virt}$ is determined. If there is no virtual tilt and/or pan, then ($\theta_{virt}, \varphi_{virt}$) will be equal to ($\theta_{real}, \varphi_{real}$). If virtual tilt and/or pan are present, then adjustments must be made to determine the virtual incident ray. Discussion of the virtual incident ray will be discussed in detail later.

In block 66, once the incident ray angle is known, then view synthesis is applied by utilizing a respective camera model (e.g., pinhole model) and respective non-planar imaging surface (e.g., cylindrical imaging surface).

In block 67, the virtual incident ray that intersects the non-planar surface is determined in the virtual image. The coordinate of the virtual incident ray intersecting the virtual non-planar surface as shown on the virtual image is represented as ($u_{virt}, v_{virt}$). As a result, a mapping of a pixel on the virtual image ($u_{virt}, v_{virt}$) corresponds to a pixel on the real image ($u_{real}, v_{real}$). Once the a correlating pixel location is determined, the scene of the virtual image may be synthesized by utilizing a pixel value of the real image and applying the pixel value to the corresponding pixel in the virtual image. Alternatively, the pixel value of the virtual image may be generated by interpolating the pixel values of neighboring pixels of the corresponding location in the real image and applying the interpolated pixel value of the real image to the corresponding pixel in the virtual image It should be understood that while the above flow diagram represents view synthesis by obtaining a pixel in the real image and finding a correlation to the virtual image, the reverse order may be performed when utilizing in a vehicle. That is, every point on the real image may not be utilized in the virtual image due to the distortion and focusing only on a respective highlighted region (e.g., cylindrical/elliptical shape). Therefore, if processing takes place with respect to these points that are not utilized, then time is wasted in processing pixels that are not utilized. Therefore, for an in-vehicle processing of the image, the reverse order is performed. That is, a location is identified in a virtual image and the corresponding point is identified in the real image. The following describes the details for identifying a pixel in the virtual image and determining a corresponding pixel in the real image.

Figure 14:
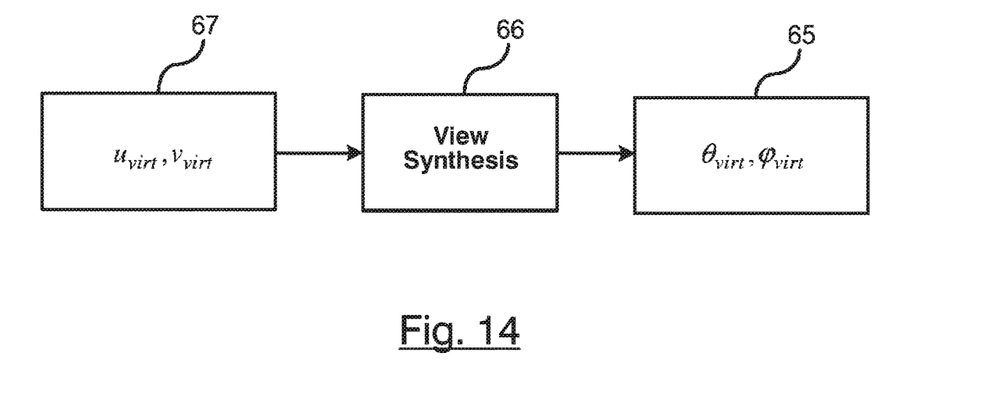
FIG. 14 is a block diagram for applying view synthesis for determining a virtual incident ray angle based on a point on a virtual image.
Figure 15:
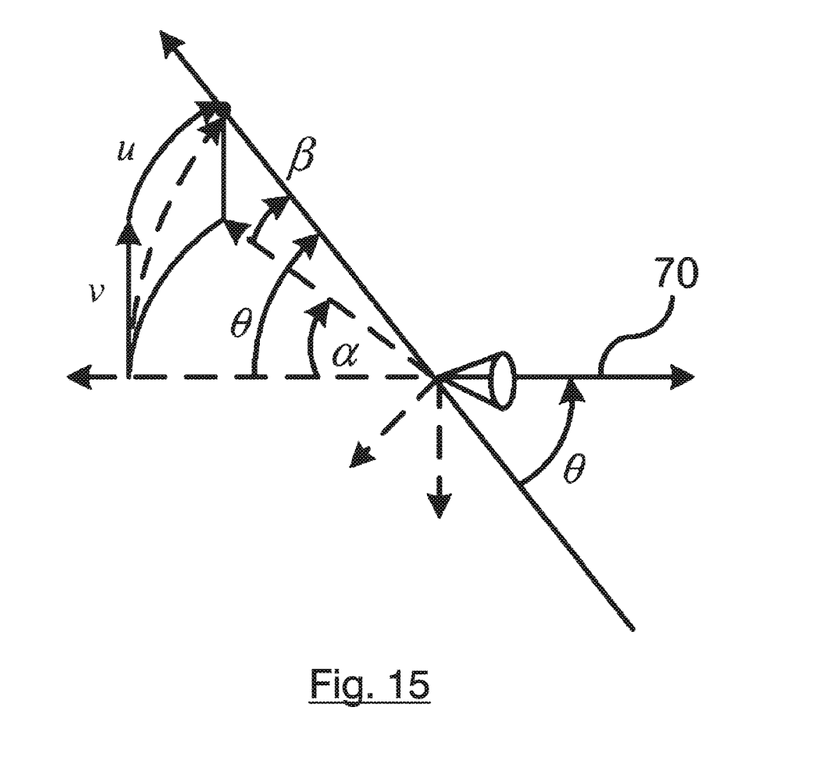
FIG. 15 is an illustration of an incident ray projected onto a respective cylindrical imaging surface model.

FIG. 14 illustrates a block diagram of the first step for obtaining a virtual coordinate ($u_{virt}, v_{virt}$) 67 and applying view synthesis 66 for identifying virtual incident angles ($\theta_{virt}, \varphi_{virt}$) 65. FIG. 15 represents an incident ray projected onto a respective cylindrical imaging surface model. The horizontal projection of incident angle $\theta$ is represented by the angle $\alpha$. The formula for determining angle $\alpha$ follows the equidistance projection as follows:

$$\frac{u_{virt} - u_0}{f_u} = \alpha \quad (5)$$

where $u_{virt}$ is the virtual image point u-axis (horizontal) coordinate, $f_u$ is the u direction (horizontal) focal length of the camera, and $u_0$ is the image center u-axis coordinate.

Next, the vertical projection of angle $\theta$ is represented by the angle $\beta$. The formula for determining angle $\beta$ follows the rectilinear projection as follows:

$$\frac{v_{virt} - v_0}{f_v} = \tan \beta \quad (6)$$

where $v_{virt}$ is the virtual image point v-axis (vertical) coordinate, $f_v$ is the v direction (vertical) focal length of the camera, and $v_0$ is the image center v-axis coordinate.

The incident ray angles can then be determined by the following formulas:

$$\begin{cases} \theta_{virt} = \arccos(\cos(\alpha) \cdot \cos(\beta)) \\ \varphi_{virt} = \arctan(\sin(\alpha) \cdot \tan(\beta)) \end{cases} \quad (7)$$

As described earlier, if there is no pan or tilt between the optical axis 70 of the virtual camera and the real camera, then the virtual incident ray ($\theta_{virt}, \varphi_{virt}$) and the real incident ray ($\theta_{real}, \varphi_{real}$) are equal. If pan and/or tilt are present, then compensation must be made to correlate the projection of the virtual incident ray and the real incident ray.

Figure 16:
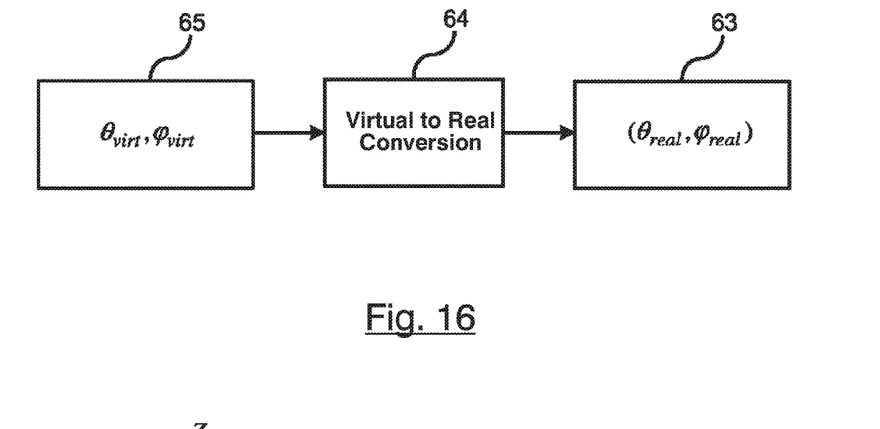
FIG. 16 is a block diagram for applying a virtual pan/tilt for determining a real incident ray angle based on a virtual incident ray angle.
Figure 17:
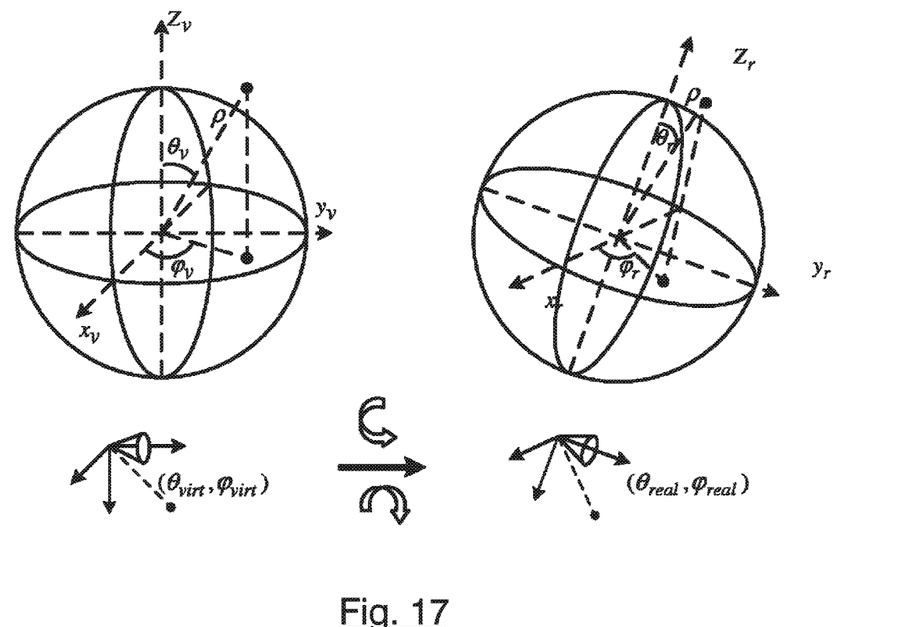
FIG. 17 is a rotational representation of a pan/tilt between a virtual incident ray angle and a real incident ray angle.

FIG. 16 illustrates the block diagram conversion from virtual incident ray angles 64 to real incident ray angles 64 when virtual tilt and/or pan 63 are present. FIG. 17 illustrates a comparison between axes changes from virtual to real due to virtual pan and/or tilt rotations and other pose (view angle) changes. The term pose as used herein refers to the camera viewing angle of the camera location defined by the camera coordinates and the orientation of the camera z-axis. The incident ray location does not change, so the correspondence virtual incident ray angles and the real incident ray angle as shown is related to the pan and tilt. The incident ray is represented by the angles ($\theta, \varphi$), where $\theta$ is the angle between the incident ray and the optical axis (represented by the z axis), and $\varphi$ is the angle between x axis and the projection of the incident ray on the x-y plane.

For each determined virtual incident ray ($\theta_{virt}, v_{virt}$), any point on the incident ray can be represented by the following matrix:

$$P_{virt} = \rho \cdot \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix}, \quad (8)$$

where $\rho$ is the distance of the point form the origin.

The virtual pan and/or tilt can be represented by a rotation matrix as follows:

$$R_{rot} = R_{tilt} \cdot R_{pan} = \begin{bmatrix} 1 & 0 & 0 \\ 0 & \cos(\beta) & \sin(\beta) \\ 0 & -\sin(\beta) & \cos(\beta) \end{bmatrix} \cdot \begin{bmatrix} \cos(\alpha) & 0 & -\sin(\alpha) \\ 0 & 1 & 0 \\ \sin(\alpha) & 0 & \cos(\alpha) \end{bmatrix} \quad (9)$$

where $\alpha$ is the pan angle, and $\beta$ is the tilt angle. It should be understood that the rotation matrix as described herein is just one of an exemplary rotation matrix, and other rotation matrices may be used includes other pose (view angle) changes in addition to tilt and/or pan. For example, a rotation matrix may include 3 degree of freedom changes or may include an entire position change.

After the virtual pan and/or tilt rotation is identified, the coordinates of a same point on the same incident ray (for the real) will be as follows:

$$P_{real} = R_{rot} \cdot R_{virt} = \rho \cdot R_{rot} \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix} = \rho \begin{bmatrix} a_1 \\ a_2 \\ a_3 \end{bmatrix}, \quad (10)$$

The new incident ray angles in the rotated coordinates system will be as follows:

$$\theta_{real} = \arctan\left(\frac{\sqrt{a_1^2 + a_2^2}}{a_3}\right), \phi = \text{real} = \arctan\left(\frac{a_2}{a_1}\right). \quad (11)$$

As a result, a correspondence is determined between ($\theta_{virt}, \varphi_{virt}$) and ($\theta_{real}, \varphi_{real}$) when tilt and/or pan are present with respect to the virtual camera model. It should be understood that that the correspondence between ($\theta_{virt}, \varphi_{virt}$) and ($\theta_{real}, \varphi_{real}$) is not related to any specific point at distance $\rho$ on the incident ray. The real incident ray angle is only related to the virtual incident ray angles ($\theta_{virt}, \varphi_{virt}$) and virtual pan and/or tilt angles $\alpha$ and $\beta$.

Once the real incident ray angles are known, the intersection of the respective light rays on the real image may be readily determined as discussed earlier. The result is a mapping of a virtual point on the virtual image to a corresponding point on the real image. This process is performed for each point on the virtual image for identifying corresponding point on the real image and generating the resulting image.

Figure 18:
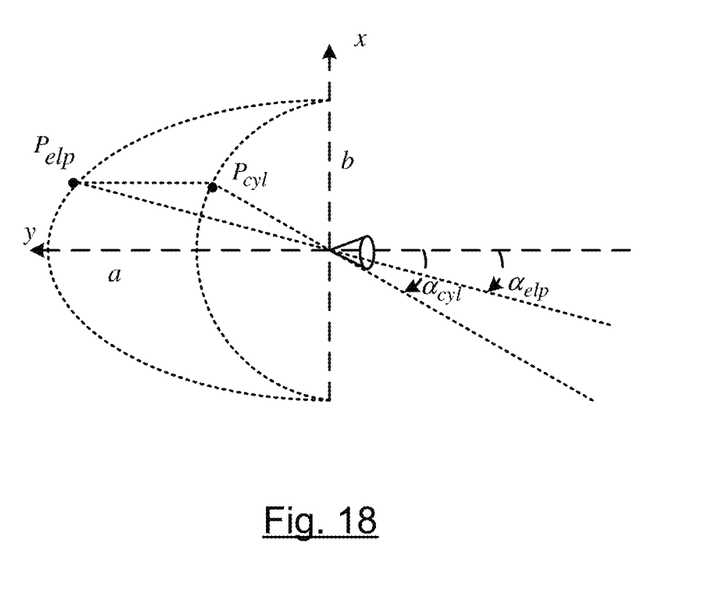
FIG. 18 is an illustration comparing imaging surfaces between an ellipse and a cylinder.

FIG. 18 illustrates a comparison of imaging surfaces between an ellipse and a cylinder. The following equations illustrate the determination of an incident angle for a horizontal component for a circle and an ellipse. A point on a circle shaped image that is intersected by the incident ray is as follows:

$$P_{cyl} = \begin{bmatrix} x_{cyl} \\ y_{cyl} \end{bmatrix} = \begin{bmatrix} b \cdot \sin(\alpha_{cyl}) \\ b \cdot \cos(\alpha_{cyl}) \end{bmatrix}, \quad (12)$$

$b$ is the circle radius, $b = f_u$;

$$u_{virt} - u_0 = \text{arc}(P_{cyl}). \quad (13)$$

In comparison, a point on an ellipse shaped image that is intersected by the incident ray is as follows:

$$P_{elp} = \begin{bmatrix} x_{elp} \\ y_{elp} \end{bmatrix} = \begin{bmatrix} b \cdot \sin(\alpha_{cyl}) \\ a \cdot \cos(\alpha_{cyl}) \end{bmatrix}, \quad (14)$$

$$\left\{ \begin{array}{l} b \text{ is the semi-minor axis, } b = f_u \\ a \text{ is the semi-major axis} \end{array} \right\};$$

$$u_{virt} - u_0 = \text{arc}(P_{elp}). \quad (15)$$

The incident angle (of the horizontal component) α in the ellipse mode is as follows:

$$\alpha_{elp} = \arctan\left(\frac{x_{ely}}{y_{ely}}\right) = \arctan\left(\frac{b}{a}\tan(\alpha_{cyl})\right). \quad (16)$$

The determination of the vertical component β, $\theta_{virt}$, and $\varphi_{virt}$ is the same as follows:

$$\frac{v_{virtual} - v_0}{f_v} = \tan\beta, \quad (17)$$

$$\left\{ \begin{array}{l} \theta_{virt} = \arccos(\cos(\alpha) \cdot \cos(\beta)) \\ \varphi_{virt} = \arctan(\sin(\alpha) \cdot \tan(\beta)) \end{array} \right\} \quad (18)$$

While certain embodiments of the present invention have been described in detail, those familiar with the art to which this invention relates will recognize various alternative designs and embodiments for practicing the invention as defined by the following claims.

What is claimed is:

1. A method of displaying a captured image on a display device comprising the steps of:
   capturing a real image by an image capture device, the image capture device using a field-of-view lens that distorts the real image;
   applying a camera model to the captured real image, the camera model mapping objects in the captured real image to an image sensor plane of the image capture device to generate a virtual image, the image sensor plane reconfigured to virtually alter a shape of the image sensor plane to a non-planar surface; and
   projecting the virtual image formed on the non-planar image surface of the image sensor to the display device;
   wherein generating the virtual image comprises the steps of:
      providing a pre-calibrated real camera model by the processor, the real camera model representative of the vision-based imaging device capturing the scene;
      determining real incident ray angles of each pixel in the captured image based on the pre-calibrated real camera model;
      identifying an arbitrary shape of the non-planar imaging surface
      identifying a pose of the virtual camera model;
      determining virtual incident ray angles of each pixel in the virtual image based on the virtual image model and the non-planar imaging surface;
      mapping a virtual incident ray to a correlated real incident ray of the real image capture device, wherein rotational compensation is applied to the virtual incident ray angles for correlating the virtual incident ray and the real incident ray if a pose of the virtual camera model is different from a pose of the of the real image capture device;
      mapping pixels in the virtual image corresponding to coordinates on the non-planar virtual imaging surface to correlated pixels on the real captured image as a function of the correlation mapping between the real incident ray and the virtual incident ray, and wherein a horizontal projection of a virtual incident angle $\theta_{virt}$ is represented by the angle α, wherein angle α is represented by the following formula:

$$\frac{u_{virt} - u_0}{f_u} = \alpha$$

where $u_{virt}$ is a virtual image point u-axis coordinate, $f_u$ is a u axis focal length of the virtual camera, and $u_0$ is an image center u-axis coordinate.

2. The method of claim 1 wherein applying a camera model to the captured real image includes applying the camera model without radial distortion correction.

3. The method of claim 1 wherein a respective real image pixel on the real image is represented by coordinates $u_{real}$ and $v_{real}$ for identifying where the real incident ray is imaged on a real image surface, wherein the real incident ray is represented by the angles ($\theta_{real}$, $\varphi_{real}$), wherein $\theta_{real}$ is an angle between the real incident ray and an optical axis of a real image capture device, and $\varphi_{real}$ is the angle between a real image capture device x axis and a projection of the real incident ray on a real image capture device x-y plane.

4. The method of claim 3 wherein the real incident ray angle is determined based on a predefined and calibrated real camera model.

5. The method of claim 4 wherein the real camera model includes a fisheye camera model, wherein the fisheye camera model represents a fisheye lens having substantial radial distortion for generating an ultra-wide angle field-of-view scene on a flat imaging plane with limited sensor size, wherein the correlation between the real incident ray and a real image pixel on the real image sensor from the real image capture device is represented as follows:

$$\text{Incident ray} \rightarrow \begin{bmatrix} \theta: \text{angle between incident ray} \\ \text{and optical axis} \\ \varphi: \text{angle between } x_{c1} \text{ and} \\ \text{incident ray projection on} \\ \text{the } x_{c1} - y_{c1} \text{ plane} \end{bmatrix} \rightarrow$$

$$\begin{bmatrix} r_d = func(\theta) \\ \varphi \end{bmatrix} \rightarrow \begin{bmatrix} u_{c1} = r_d \cdot \cos(\varphi) \\ v_{c1} = r_d \cdot \sin(\varphi) \end{bmatrix}$$

where $u_{c1}$ represents $u_{real}$ and $v_{c1}$ represents $v_{real}$.

6. The method of claim 5 wherein a radial distortion correction is applied to the fisheye camera model, wherein a radial distortion is determined by a distortion effect of a lens of the vision-based imaging device, wherein the radial distortion is represented by a function of the distorted radial distance with respect to an undistorted variable, wherein a distorted radial distance is measured from a respective image pixel to an image center on an image sensor of the real image capture device using the lens with distortion effect, wherein the un-distorted variable includes an incident ray angle of the incident chief ray which is imaged to the distorted image pixel, wherein the radial distortion for vision-based imaging device having a field-of-view greater than 135 degrees is represented by the following formula:

$$r_d = p_1 \cdot \theta_0 + p_2 \cdot \theta_0^3 + p_3 \cdot \theta_0^5 + \ldots$$

where p are distortion parameters.

7. The method of claim 4 wherein a radial distortion correction is applied to a real camera model when radial distortion is present, wherein the radial distortion is represented by a function of the distorted radial distance with respect to an undistorted variable, wherein the undistorted variable includes an undistorted radial distance of an image pixel based on a pin-hole camera model, and wherein the radial distortion for vision-based imaging device having a field-of-view less than 135 degrees is represented by the following formula:

$$r_d = r_0(1 + k_1 \cdot r_0^2 + k_2 \cdot r_0^4 + k_2 \cdot r_0^6 + \ldots)$$

where point $r_0$ is the undistorted radial distance, wherein $r_0$ is determined using a pinhole model and includes intrinsic and extrinsic parameters, and wherein k are radial distortion parameters.

8. The method of claim 4 wherein a real camera is modeled as a pinhole model with a non-planar imaging surface, wherein the pinhole model represents a lens without radial distortion, and wherein a radial distortion effect of a real camera lens is modeled into the non-planar imaging surface.

9. The method of claim 1 wherein a vertical projection of a virtual incident angle incident angle $\theta_{virt}$ is represented by the angle β, wherein angle β is represented by the following formula:

$$\frac{v_{virt} - v_0}{f_v} = \tan\beta$$

where $v_{virt}$ is a virtual image point v-axis-vertical coordinate, $f_v$ is a v direction (vertical) focal length of the virtual camera, and $v_0$ is an image center v-axis coordinate.

10. The method of claim 9 wherein the virtual incident ray angles are determined by the following formulas:

$$\begin{cases} \theta_{virt} = \arccos(\cos(\alpha) \cdot \cos(\beta)) \\ \varphi_{virt} = \arctan(\sin(\alpha) \cdot \tan(\beta)) \end{cases}.$$

11. The method of claim 1 wherein if the pose of the virtual camera model is different than the real camera model, then $\theta_{virt}$ is an angle between the virtual incident ray and the virtual optical axis represented by a virtual z axis, and $\varphi_{virt}$ is an angle between a virtual camera x axis and a projection of the virtual incident ray on the virtual camera model x-y plane, wherein any point on the virtual incident ray is represented by the following matrix:

$$P_{virt} = \rho \cdot \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix}$$

where ρ is the distance of the point from an origin which is a camera aperture location of the virtual camera model.

12. The method of claim 11 wherein the difference between the pose of the virtual camera model and the pose of the real camera model is represented by a rotation matrix.

13. The method of claim 12 wherein the coordinates of a same point on the correlated real incident ray and the virtual incident ray for the identified pose difference between the virtual camera model and the real camera model is represented by the following matrix:

$$P_{real} = R_{rot} \cdot P_{virt} = \rho \cdot R_{rot} \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix} = \rho \begin{bmatrix} a_1 \\ a_2 \\ a_3 \end{bmatrix}.$$

14. The method of claim 13 wherein real incident ray angles $(\theta_{real}, \varphi_{real})$ is determined by the following formula:

$$\theta_{real} = \arctan\left(\frac{\sqrt{a_1^2 + a_2^2}}{a_3}\right), \varphi_{real} = \arctan\left(\frac{a_2}{a_1}\right).$$

15. The method of claim 1 wherein a virtual incident ray angles $(\theta_{virt}, \varphi_{virt})$ is equal to a real incident ray $(\theta_{real}, \varphi_{real})$ if the pose of the virtual camera model and the real camera model are the same.

16. The method of claim 1 wherein the virtual camera model includes a pin-hole camera model.

17. The method of claim 1 wherein the non-planar imaging surface includes an elliptical imaging surface.

18. The method of claim 1 wherein the non-planar imaging surface includes a cylindrical imaging surface.

19. The method of claim 1 wherein the non-planar imaging surface includes a spherical imaging surface.

20. The method of claim 1 wherein the non-planar imaging surface is an arbitrary shape that satisfies a homographic mapping from respective image pixels projected on the non-planar image surface to respective incident rays.

21. The method of claim 20 wherein the non-planar imaging surface is dynamically switched to another arbitrary shape based on a driving scenario for a respective vehicle operation, wherein the selected arbitrary shape enhances the virtual image projected on the display device for the respective vehicle operation.

22. The method of claim 1 wherein the vision-based imaging device is a rear back-up camera.

23. The method of claim 1 wherein the vision-based imaging device is a side-view camera.

24. The method of claim 1 wherein the vision-based imaging device is a front-view camera.

25. The method of claim 1 wherein generating the virtual camera model includes defining a virtual camera pose, wherein a difference between in the pose of a virtual camera model and a pose of the vision-based imaging device is modeled as a rotation matrix.

26. The method of claim 25 wherein the difference in the pose of the virtual camera pose and the pose of the vision-based imaging device is modeled by rotating the image surface, wherein rotating the image surface maintains the same pose between the virtual camera model and the vision-based imaging device pose.

27. The method of claim 1 wherein generating the virtual imaging comprises the steps of:

constructing a coordinate system for a respective camera model, that includes a x-axis, a-axis, and a z-axis, the z-axis being aligned with a camera optical axis extending outward the respective camera model, the x-axis and the y-axis forming a plane perpendicular to the z-axis, the x-axis and the z-axis intersecting at a camera aperture location;

defining the camera pose as the location of the camera coordinates and the orientation of the camera z-axis;

generating a real camera model that is representative of the vision-based imaging device, the real image being a scene captured by the vision-based imagining device;

generating a virtual camera model including simulated camera model parameters, a simulated imaging surface, and a simulated camera pose;

identifying a virtual image that is a synthesized image of a scene using the virtual camera model;

selecting a shape of the non-planar imaging surface;

selecting a pose of the virtual camera model;

determining a virtual incident ray angle for each pixel in the virtual image based on the virtual camera model using the non-planar imaging surface;

determining whether the pose of the virtual camera model is the same as a pose of the real camera model in response to comparing the virtual incident ray angle and the real incident real angle;

applying a rotational matrix for correlating the virtual incident angle and the real incident angle in response to a difference in the poses of the virtual camera model and the virtual camera model, the rotational matrix representing a transformation for correlating the virtual camera pose to the real camera pose;

determining a corresponding pixel location by applying the real camera model with angular distortion parameters, wherein the real camera model with angular distortion represents an imaging process of the vision-based imaging device capturing a scene, and wherein parameters of the real camera model with angular distortion are determined by a camera calibration process;

generating a mapping between a respective virtual image pixel location and a respective real image pixel location as a function of a respective virtual image pixel coordinate, the virtual incident ray angle, the real incident ray angle, and the real image pixel coordinate; and synthesizing the virtual image of the scene from the real image, wherein a pixel value of the real image is utilized as the pixel value for a corresponding pixel in the virtual image.

28. The method of claim 27 wherein the synthesizing the virtual image of the scene from the real image includes interpolating of the pixel values of neighboring pixels of the corresponding location in the real image for determining the corresponding pixel value in the virtual image.

29. The method of claim 1 wherein a dynamic view synthesis for generating the virtual image is enabled based on a driving scenario of a vehicle operation, wherein the dynamic view synthesis generates a direction zoom to a region of the image for enhancing visual awareness to a driver for the respective region.

30. The method of claim 29 wherein the driving scenario of a vehicle operation for enabling the dynamic view synthesis includes determining whether the vehicle is driving in a parking lot.

31. The method of claim 30 wherein the driving scenario of a vehicle operation for enabling the dynamic view synthesis includes determining whether the vehicle is driving in on highway.

32. The method of claim 31 wherein the driving scenario of a vehicle operation for enabling the dynamic view synthesis includes actuating a turn signal.

33. The method of claim 32 wherein the driving scenario of a vehicle operation for enabling the dynamic view synthesis is based on a steering wheel angle.

34. The method of claim 33 wherein the driving scenario of a vehicle operation for enabling the dynamic view synthesis is based on a speed of the vehicle.

* * * * *